United States Patent [19]

Townsend, Jr.

[11] E Re. 29,452

[45] Reissued Oct. 25, 1977

[54] HEADWEAR CONSTRUCTION

[76] Inventor: Charles E. Townsend, Jr., 11 Ranch Road, Orinda, Calif. 94563

[21] Appl. No.: 537,792

[22] Filed: Dec. 30, 1974

Related U.S. Patent Documents

Reissue of:

[64] Patent No.: 3,811,130
Issued: May 21, 1974
Appl. No.: 297,140
Filed: Oct. 12, 1972

U.S. Applications:

[63] Continuation-in-part of Ser. No. 89,218, Nov. 13, 1970, abandoned.

[51] Int. Cl.[2] ..... A42B 1/18
[52] U.S. Cl. ..... 2/177
[58] Field of Search ..... 2/177, 175, 195, 198, 2/3 R, 192, 200; 161/68; 223/7, 12

[56] References Cited

U.S. PATENT DOCUMENTS

| | | | |
|---|---|---|---|
| 1,996,254 | 4/1935 | Parlow | 2/192 |
| 2,302,226 | 11/1942 | Josephs et al. | 2/192 |
| 3,112,184 | 11/1963 | Hollenbach | 161/68 |
| 3,169,251 | 2/1965 | Humes, Jr. | 2/177 |
| 3,447,163 | 6/1969 | Bothwell et al. | 2/3 R |
| 3,773,614 | 11/1973 | Pennington | 162/357 |

*Primary Examiner*—Werner H. Schroeder
*Assistant Examiner*—Peter Nerbun
*Attorney, Agent, or Firm*—Townsend and Townsend

[57] ABSTRACT

A headwear and a method of manufacturing headwear providing 95 percent or greater ventilation while at the same time providing adequate shade protection are described. The headwear comprises a crown section of cellular honeycomb, the cumulative cross-sectional open cell area accounting for at least 90 percent of the total surface area, contoured in such a manner as to provide a progressive divergence of angularity between adjacent cells of the honeycomb. The method comprises spirally winding together an elongate flat strip and an elongate corrugated strip on a headwear shaped form. The flat and corrugated strips are thus disposed in alternating arrangement defining open cells therebetween to form a cellular honeycomb contoured to the shape of the form.

1 Claim, 8 Drawing Figures

HEADWEAR CONSTRUCTION

Matter enclosed in heavy brackets [ ] appears in the original patent but forms no part of this reissue specification; matter printed in italics indicates the additions made by reissue.

This *application is a reissue of Ser. No. 297,140, filed Oct. 12, 1972, now Pat. No. 3,811,130 which* is a continuation-in-part of [my earlier] copending patent application Ser. No. 89,218, filed Nov. 13, 1970, now abandoned.

The present invention relates to improvements in headwear.

More particularly, the present invention relates to headwear construction especially adapted for what might broadly be classified as outdoor sports caps or hats such as used by golfers, tennis players, boatsmen, sunbathers and outdoorsmen, where the principal purpose of the head covering is to provide comfortable shade protection for the head of the wearer. As will be seen, the present invention may be utilized in the manufacture of caps having sunshade visors. The headwear construction of the present invention can also be utilized in the manufacture of hats having full brims, the brim being either an integral part of the headpiece or formed as a separate piece and attached thereto.

According to a first aspect of the present invention, there is provided a form of head covering of the type having a shaped crown and which comprises more specifically an arcuately contoured section of cellular honeycomb which is so dimensioned, oriented and arranged in combination as to optimally provide approximately 95 percent or greater ventilation through the crown while at the same time providing adequate sunshade protection to the wearer's head from the direct rays of the sun.

A feature of this invention is that the headpiece can be made to fit so comfortably as to make the user virtually unaware of the fact that he is wearing a protective head covering.

The honeycomb used in this construction may be made from any non-absorbing material such as non-absorbent polyvinyl chloride, polyethylene or other plastics, plastic impregnated papers or fibers, and the like. The cellular honeycomb may even be constructed from metals. By use of such non-absorbent material, the need for providing absorbent sweat bands is preferably eliminated. In this connection, the use of absorbent sweat bands is undesirable in that such materials can and do become uncomfortably saturated or stained from perspiration.

The cellular honeycomb is preferably constructed with the axes of its open end cells extending perpendicularly therethrough. The cell axes are thus substantially perpendicular to the surface of the headwear. The radius of curvature of the contoured honeycomb section is sufficiently short so as to establish a progressive divergence of angularity between adjacent cells. The transmittal of sunrays therethrough will be limited by the angle of incidence of said rays on a particular cell and the transmittal angle of the cell, all cells for a particular honeycomb having approximately the same transmittal angle. It is preferred that the transmittal angle for the honeycomb used in the headwear of this invention be not greater than 45° and preferably between 45° and 30°. Such range, it has been found, provides for an optimum interrelationship between size, flexibility and overall weight of the honeycomb material used in the forming of the headwear. As a further requirement, the cellular honeycomb employed herein should have a cross-sectional open cell area of at least about 90 percent of the total area of the shaped crown.

As used herein, the term angle of incidence defines the angle made by the sun's rays with a line perpendicular to the surface on which the rays fall. Thus, the angle of incidence at a particular area on the headwear corresponds to the angle between the sun's ray and the axis of the cell at that area. The angle of transmittal, a function solely of the honeycomb cell configuration, defines the maximum incident angle of the sun's rays which can pass through a given cell.

According to a second aspect of the present invention, a convenient method for fabricating headwear of the type described hereinbefore is provided. Specifically, the method comprises spirally winding together an elongate flat strip and an elongate corrugated strip on a headwear-shaped form. The flat and corrugated strips are thus disposed in alternating arrangement defining open cells therebetween. A cellular honeycomb is thus formed contoured to the shape of the form. The form may correspond in shape to the crown of the headwear, thus conveniently forming a crown section to which a brim or visor may subsequently be attached. Alternatively, the form may include a lower, outwardly extending, annular portion so as to form a honeycomb brim integral with the crown.

According to the preferred embodiment of the method of the present invention, the flat and corrugated strips are dispensed from fixed supply rolls and the winding is accomplished by rotating the form. The strips are preferably maintained substantially perpendicular to the form during winding, so that the headwear thus produced will advantageously possess the cell orientation described with respect to the first aspect of the present invention.

The method of the present invention is advantageous in that the honeycomb material is simultaneously fabricated and contoured, to form the desired honeycomb headwear with a minimum of difficulty. In contrast, the bending of a flat honeycomb sheet into the desired contour might pose serious manufacturing difficulties.

Other features, modifications and advantages of this invention will become apparent by reference to the accompanying drawings in which similar characteristics of reference may represent corresponding parts in each of the several views. In the drawings.

Figure 1:
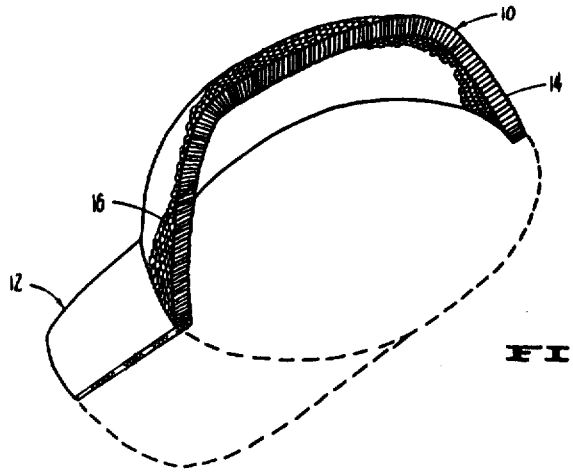
FIG. 1 is a cut-away perspective representational view of a cap type headwear embodying the features of this invention.
Figure 2:
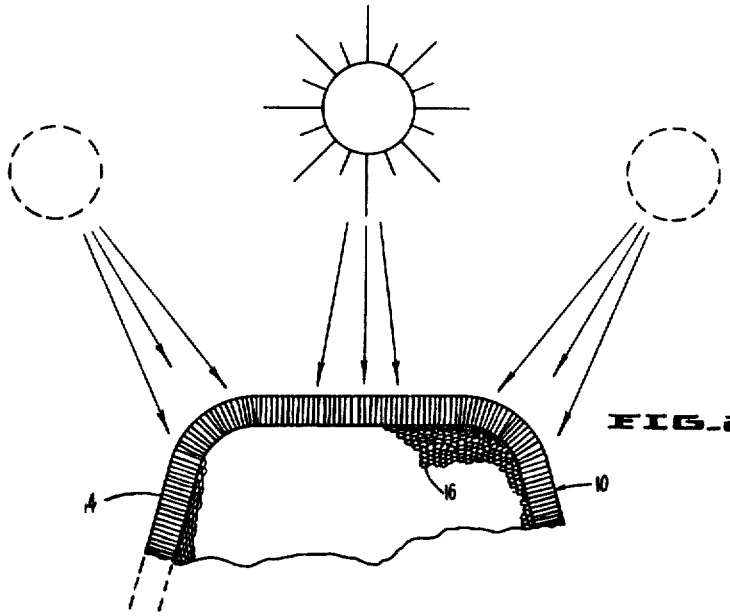
FIG. 2 is an exploded partial side view of the shaped crown of FIG. 1 illustrating the relationship between the relative position of the sun to the amount of light transmitted through the cells of the honeycomb.
Figure 3:
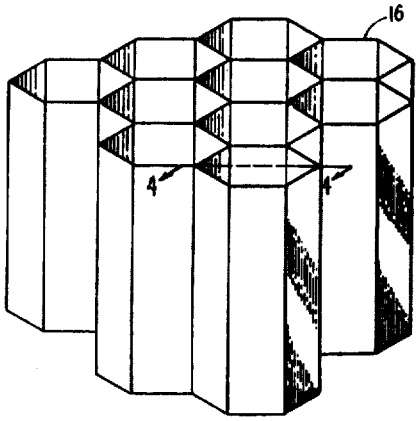
FIG. 3 is an enlarged perspective view of several cells of the honeycomb as illustrated in FIG. 1.

Referring more specifically to the drawings, and particularly to FIGS. 1 and 2, a cap construction is shown comprising a shaped crown 10 having a visor 12 affixed thereto. If desired, the visor may be integrally formed with the crown. The crown 10 is formed of an arcuately contoured section of open end honeycomb material 14 having a plurality of open ended cells 16. The honeycomb material may be folded or vacuum formed sheet plastic material such as polyethylene, polyvinylchloride, acrylic and the like. The crown may also be made from arcuately formed plastic impregnated paper, fabric materials, aluminum or other light weight metal honeycomb type materials. The material selected may be tinted, colored or otherwise treated depending on decorative or other aesthetic objects to be fulfilled. With the sun directly overhead, light will be transmitted through cells 16 over a limited portion of the crown 10. In general, the portion of the crown through which light will be transmitted will be of a function of the particular transmittal angle for a given honeycomb construction and the incident angle of the sun's rays. Light is transmitted only through those cells wherein the angle of transmittal is greater than the angle of incidence of the sun light. While some light will be transmitted through the cells of the honeycomb, such constitutes a relatively small percentage of the incident light falling upon the headpiece.

Whether or not the user is moving or remaining static, the angle of incidence of sunlight to the cells of the headpiece will constantly be changing. If the wearer of the headgear remains motionless for a prolonged period of time, still no one area will be subjected to an extended exposure to sunlight as the relative movement of the sun itself results in a changing angle of incidence.

Figure 4:
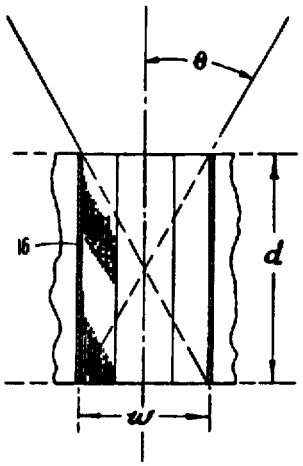
FIG. 4 is a sectional view taken along line 4—4 of FIG. 3.

The angle of transmittal is a function of the physical size of the honeycomb as shown in FIG. 4. The depth d of the honeycomb is measured along the cell axis, and the width w is measured across the widest spacing in the cell. By increasing the depth of the honeycomb cell, the angle of transmittal $\theta$ for a particular cell is reduced. The depth to which the cells of a given honeycomb should be constructed will primarily be a function of convenience and aesthetics. The greater the depth, the more effective the light blocking properties of the honeycomb. The depth of the honeycomb cell may conveniently vary from as little as one-quarter of an inch to as much as 1 inch or more. However, at depths less than one-quarter of an inch, the width of the cells required to effectively reduce light transmittal becomes so small as to result in a loss of overall open cell area. At depths greater than 1 inch, the headwear tends to become cumbersome, although still effective to shade the wearer and provide a maximum of ventilation.

It is contemplated, that the angle of transmittal for a particular honeycomb structure used in this invention will not exceed 45°. For such an angle of transmittal, the ratio of depth to width of a cell will be 1.00. The depth to width ratio for the honeycomb cell for transmittal angles other than 45° may be calculated from the following formula:

$$d/w = \tan(90° - \theta)$$

where $\theta$ is the angle of transmittal.

Besides constructing the honeycomb cells so as to decrease the angle of transmittal, the shade protection offered by the crown itself may be increased by forming the crown in such a manner as to increase the rate of progressive divergence between adjacent cells. By increasing the radius of curvature of the arcuately contoured section, an increased divergence of angularity can be affected.

Figure 5:
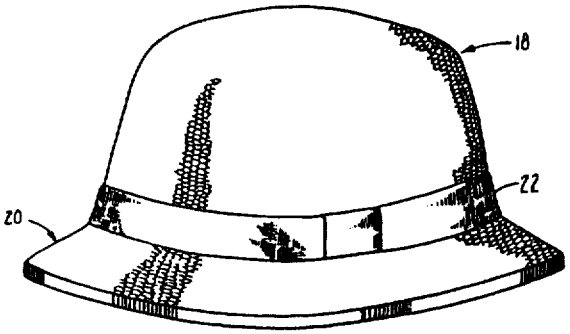
FIG. 5 is a perspective side elevation of a modified type of headwear embodying the features of this invention.

In FIG. 5, a modified type of headwear is illustrated having a crown 18 and a circular brim 20. Circular band 22 is affixed about crown 18 and serves to visually delineate the boundary between the crown and the brim. The brim may form part of the continuous piece of honeycomb material used for the construction of the crown. It is also contemplated that brims commonly used with existing headwear be employed. Such brims or visors could be attached to the honeycomb crown by any suitable means.

The term "cellular material" and/or "honeycomb" as may be used in this Specification and in the claims is intended to include substantially any form of cellular material having geometrically shaped cells in cross-section and which can function to provide both the required ventilation as well as sun-ray cut-off angles as required.

The invention is not limited to the specific types of materials from which the hat may be made or the manner in which such material may be manufactured, fabricated or formed. It is visualized that the honeycomb crown and/or other portions of the headpiece may be made by either conventional honeycomb manufacturing techniques in known configurations such as generally disclosed in representative U.S. Pat. Nos. 2,610,934, 3,416,983, 3,342,666, and 3,205,109 or such components may be formed in different configurations and according to the manufacturers choice by techniques such as vacuum forming extrusion, or molding or the like.

Figure 7:
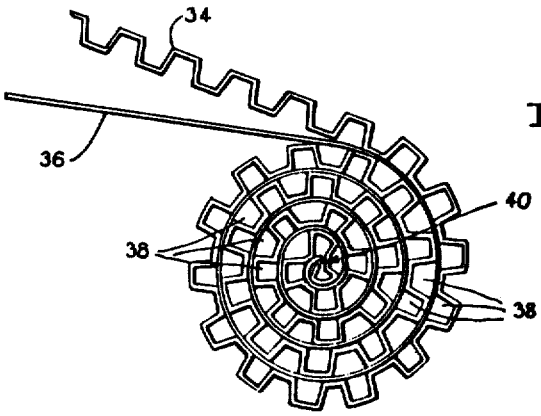
FIG. 7 is an enlarged plan view of the central portion of the headwear depicted in FIG. 6.
Figure 8:
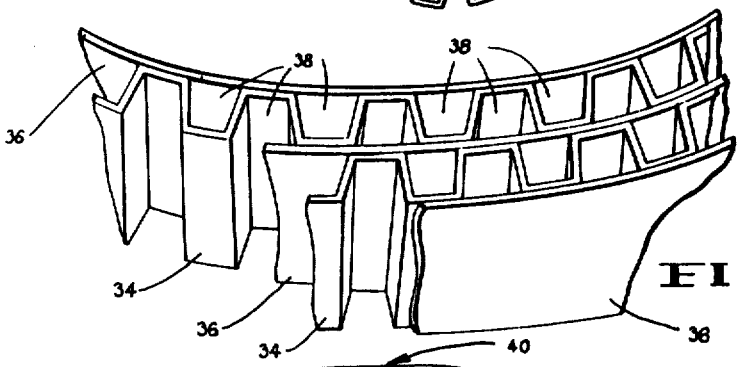
FIG. 8 is a perspective view, still further enlarged, of a plurality of cells of the honeycomb headwear depicted in FIG. 6.
Figure 6:
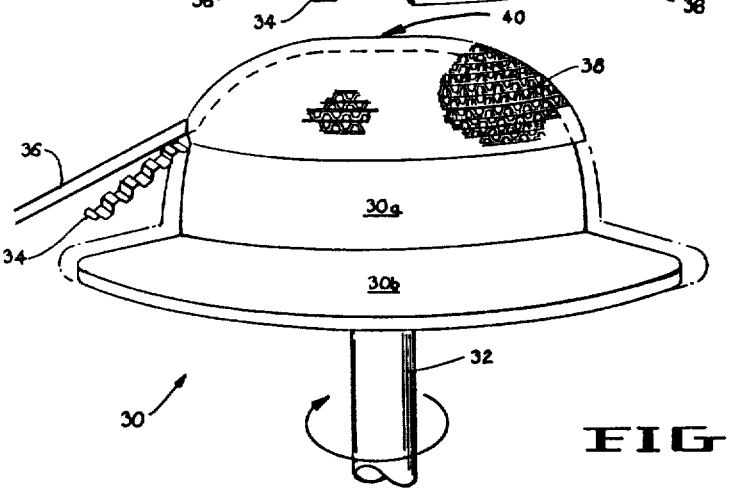
FIG. 6 is a side elevation of a rotatable form having a cellular honeycomb headwear partially formed thereon in accordance with the method of the present invention.

Referring now to FIGS. 6 through 8, a particularly convenient method for manufacturing headwear of the general type described hereinbefore will now be described in detail. Referring specifically to FIG. 6, there is provided a headwear shaped form 30 rotatably mounted on a shaft 32. Form 30 may include a crown-forming portion 30a, and a lower, outwardly extending annular brim-forming portion 30b. As will be more readily apparent hereinafter, brim-forming portion 30b functions to produce a cellular honeycomb headwear having an integrally formed annular brim. Alternatively, brim forming portion 30b may be deleted, so that only a crown portion will be formed on the form 30. A brim or visor may subsequently be attached to the crown, if desired, to form the completed headwear.

In accordance with the method [fo] *of* the present invention, there is provided an elongate corrugated strip 34 and an elongate flat strip 36. Strips 34 and 36 are spirally wound together on form 30 to form a contoured section of open cell honeycomb in the shape of the desired headwear. Thus, the width of strips 34 and 36 corresponds to the desired cell depth. The cross-sectional shape and dimensions of the cells are determined by the shape and dimensions of the corrugations of strip 34.

In greater detail, strips 34 and 36 may conveniently be provided on supply rolls (not shown), and the ends thereof disposed at the center of the top of the crown, shown generally at 40. Shaft 32 is rotated, causing strips 34 and 36 to be drawn off the supply rolls and spirally wound together on form 30. The spiral configuration thus formed is best depicted in FIG. 7. It is apparent therefrom that the spiral configuration thus formed spirals outwardly from the top center 40 of the crown, with the corrugations in strip 34 cooperating with strip 36 to define a plurality of open cells 38 therebetween.

To facilitate the starting of the winding, a small cylindrical mandrel (not shown) may be provided at the top center 40 of the crown. The mandrel may comprise an upwardly extending portion of form 30 which will thus be removed from the headwear upon subsequent removal pf the headwear from form 30. Alternatively, the mandrel may comprise a separate structure which may remain in the headwear or may subsequently be removed.

A suitable adhesive is applied to either or both of the strips 34 and 36 prior to or during winding. Preferably, the adhesive is applied only to those surfaces of the corrugations of strip 34 which will directly abut strip 36 upon winding, to minimize the waste of adhesive on surfaces where it is unnecessary.

Referring specifically to FIG. 8, it is apparent that the spiral winding procedure thus described may be regarded as forming an alternation of flat strips 36 and corrugated strips 34, forming rows of honeycomb cells 38. The cross-sectional shape of each of the cells 38 is determined by the configuration of the corrugations of strip 34, as referred to briefly hereinbefore. As best shown in FIG. 8, corrugated strip 34 may typically comprise a series of folds, at equally spaced locations, of somewhat more than 90°, the folds alternating in direction. The cells 38, formed therefrom thus possess a generally trapezoidal cross-sectional shape. Cells of square cross section may be obtained by the use of a corrugated strip having equally spaced 90° bends or folds. It is thus apparent that a particular desired cell shape may be achieved by the judicious selection of the corrugated strip.

The thus described spiral winding is continued until the entire crown section, and brim if desired, of the headwear is formed. By maintaining the strips 34 and 36 substantially perpendicular to the surface of form 30 during winding, the honeycomb will be formed with the cell axes perpendicular to the surface of the headwear, to produce the headwear described hereinbefore, having the desired shade-providing properties. Upon completion of the procedures thus described, the honeycomb headwear thus formed is removed from form 30 to complete the fabrication.

Having thus described the foregoing invention in some detail by way of illustration for the purposes of clarity and understanding, it will be apparent to one skilled in the art that certain changes and modifications may be practiced within the spirit of this invention as limited only by the scope of the appended claims.

What is claimed is:

[1. A headwear construction so adapted as to continually deflect solar rays, yet provide maximum ventilation, comprising a continuous crown section of open celled honeycomb material having a compound curvature, each cell thereof hving a substantially equal cross-sectional dimension, the axes of adjacent individual cells diverging relative to one another to obliquely intersect said solar rays over the majority of the total crown area at any given moment, said open celled honeycomb material comprising a continuous elongate flat strip and a continuous elongate corrugated strip spirally wound together to form the continuous curved surface of said crown.]

[2. The headwear according to claim 1 wherein each of said axes are substantially perpendicular to that segment of the wearer's skull to which they are respectively contiguous.]

[3. The headwear according to claim 2, wherein the length of the side walls of said honeycomb is at least equal to the nominal diameter of the cells to limit the angle of transmittal of said cells, so that said solar rays will be deflected at any given instant.]

[4. The headwear according to claim 3 wherein the angle of transmittal $\theta$ of each said cell is less than about 45° as determined by the following equation: $\tan(90° - \theta) = d/w$, wherein w is the nominal diameter of said cells and d is the thickness of said cells.]

[5. The headwear of claim 1 wherein said open cell honeycomb material is contoured to define an arcuately shaped crown.]

[6. The headwear covering of claim 5 wherein the cumulative cross-sectional area of the open cell areas of the crown is at least about 90 percent.]

[7. The headwear of claim 1 wherein the thickness of the honeycomb measured in the direction of the cell axes and the nominal diameter of the cells are related to one another to limit the angle of incidence through which direct overhead sunrays can be transmitted through any given cell; the cumulative cross-sectional open cell areas of the crown amounting to at least 90 percent of the total surface area of the crown; the radius of curvature of the arcuately contoured honeycomb section being sufficiently tight to establish a progressive divergence of angularity between adjacent cell axes whereby to limit direct sunray transmittal through the crown to a minor fractional area thereof at any given instant.]

[8. The headwear construction of claim 7 wherein the angle of incidence through which direct overhead sunrays can be transmitted is limited to an angle not substantially exceeding 45°.]

[9. The headwear of claim 7 so adapted as to deflect solar rays yet provide maximum ventilation wherein each cell of the honeycomb has a predetermined angle of sunlight transmitted ($\theta$), said angle being a function of the ratio of cell thickness (d) to cell width (w) of each cell at its widest space as follows:

$d/w = \tan(90° - \theta)''$, $\theta < 45°$.]

*10. A headwear construction having a shaped crown comprising an arcuately contoured section of cellular honeycomb having compound curvature and disposed with the axes of its opened cells extending radially therethrough; each cell of said honeycomb having a substantially equal cross-sectional dimension; the thickness of the honeycomb measured in the direction of the cell axes and the nominal diameter of the cells being related to one another to limit the angle of incidence through which overhead sunrays can be transmitted through any given cell; the cumulative cross-sectional open cell areas of the crown amounting to at least 90 percent of the total surface area of the crown; the radius of curvature of the arcuately contoured honeycomb section in each compound direction being sufficiently tight to establish a progressive divergence of angularity between adjacent cell axes in each said direction whereby to limit direct sunray transmittal through the crown to a minor fractional area thereof at any given instant.*

* * * * *